United States Patent [19]

Boge

[11] Patent Number: 4,878,389

[45] Date of Patent: Nov. 7, 1989

[54] BELLOWS FOR PROTECTING KNUCKLE JOINTS

[76] Inventor: Ferdinand Boge, G. Keller 35, 6204 Taunusstein, Fed. Rep. of Germany

[21] Appl. No.: 271,688

[22] Filed: Nov. 16, 1988

[30] Foreign Application Priority Data

Apr. 22, 1988 [DE] Fed. Rep. of Germany ....... 3813782

[51] Int. Cl.⁴ .............................................. F16J 15/50
[52] U.S. Cl. ...................................... 74/18.1; 403/51; 403/134; 277/212 FB; 464/175
[58] Field of Search ................... 74/18.1, 18.2, 473 R, 74/566, 523, 491, 471 R, 543, 469, 471 XY, 558, 558.5; 403/50, 51, 134; 277/212 FB, 212 R, 212 F; 464/175, 173, 133

[56] References Cited

U.S. PATENT DOCUMENTS

| | | | |
|---|---|---|---|
| 3,279,832 | 10/1966 | Bergman | 74/18.1 X |
| 3,279,833 | 10/1966 | Ihnacik | 74/18.1 X |
| 3,404,909 | 10/1968 | Gottschald | 403/51 |
| 4,304,416 | 12/1981 | Oshima | 74/18.1 X |
| 4,597,745 | 7/1986 | Orian | 277/212 FB X |
| 4,673,188 | 6/1987 | Matsuno et al. | 277/212 FB |
| 4,702,483 | 10/1987 | Ukai et al. | 277/212 FB |
| 4,718,680 | 1/1988 | Halconruy et al. | 403/50 X |
| 4,730,834 | 3/1988 | Ukai et al. | 403/50 X |

FOREIGN PATENT DOCUMENTS

| | | | |
|---|---|---|---|
| 1525900 | 9/1969 | Fed. Rep. of Germany | 277/212 FB |
| 3324997 | 1/1985 | Fed. Rep. of Germany | 74/18.1 |
| 1000617 | 8/1965 | United Kingdom | 403/51 |

*Primary Examiner*—Vinh Luong
*Attorney, Agent, or Firm*—Kerkam, Stowell, Kondracki & Clarke

[57] ABSTRACT

A bellows for protecting knuckle joints structured so that a narrower end can be connected to a shaft and a wider end can be connected to a universal joint. Additionally, intermediate sections have graduated diameters such that connections can be made with various size shafts and various size universal joints. The bellows includes a number of T-flanges in oder to connect the bellows to different size disks corresponding to different universal joints.

7 Claims, 2 Drawing Sheets

BELLOWS FOR PROTECTING KNUCKLE JOINTS

FIELD OF THE INVENTION

The invention relates to a bellows for protecting knuckle joints, having cylindrical connecting surfaces at its ends which can be drawn over machine parts, e.g. shafts, and secured by means of a tightening strap.

BACKGROUND OF THE INVENTION

Bellows of this type are designed to protect sensitive machine parts such as, for example, joints, from contamination and to prevent the leaking of lubricants. By means of the pliability of their materials as well as their shape they are designed to compensate for movements, e.g. bends, axial or radial displacements. The bellows are required to have a length corresponding to that of the machine part to be protected.

A known bellows (German Published, Non-Examined Patent Application No. DE-OS 33 24 997) has the maximum length for a particular area and, besides the connecting points at the ends, a plurality of further connecting points with separating grooves between the folds so that there is the possibility to make cutoffs as required. However, this known bellows (universal bellows) is only suitable for drawing over jointed shafts of different sizes (diameters).

SUMMARY OF THE INVENTION

It is an object of the invention to design a bellows, preferably in the form of a universal bellows which can be cut off, in such a way that it can be connected on one end to shafts and on the other end to disk-shaped machine parts or, in particular, can be used for the protection of universal joints.

Such a bellows is shaped on one end, i.e. on the end having the larger diameter, in such a way that a T-shaped flange abuts against the front of a disk, by means of which the position is defined. In a cylindrical section on its exterior the T-flange a rectangular groove is defined which may be used to receive a tightening strap. In a preferred embodiment, a semicircular groove is formed in the bottom of the rectangular groove, to which corresponds a shaped semicircular bead on the inside. By means of this design it is possible to connect two bellows on top of each other, one extending to the left and the other to the right, at the edge of the disk, the bead of the outer bellows extending into the groove of the rear bellows. This connection, too, can be secured by means of a tightening strap.

In a preferred way the bellows in accordance with the invention is in the form of a universal bellows, i.e. its length in a particular area is tailored to be the largest size possible and a plurality of connecting points are provided between the folds for, on the one hand, connection with a shaft and, on the other, for connection with a disk-shaped machine part. Thus there are several possibilities to shorten such a universal bellows to the size needed and thus to satisfy a variety of requirements. The economics of such a bellows is the result of the unity of construction and storage.

Below, exemplary embodiments of the invention are described in detail, reference being made to the attached drawings.

DETAILED DESCRIPTION OF THE PREFERRED EMBODIMENTS

Figure 1:
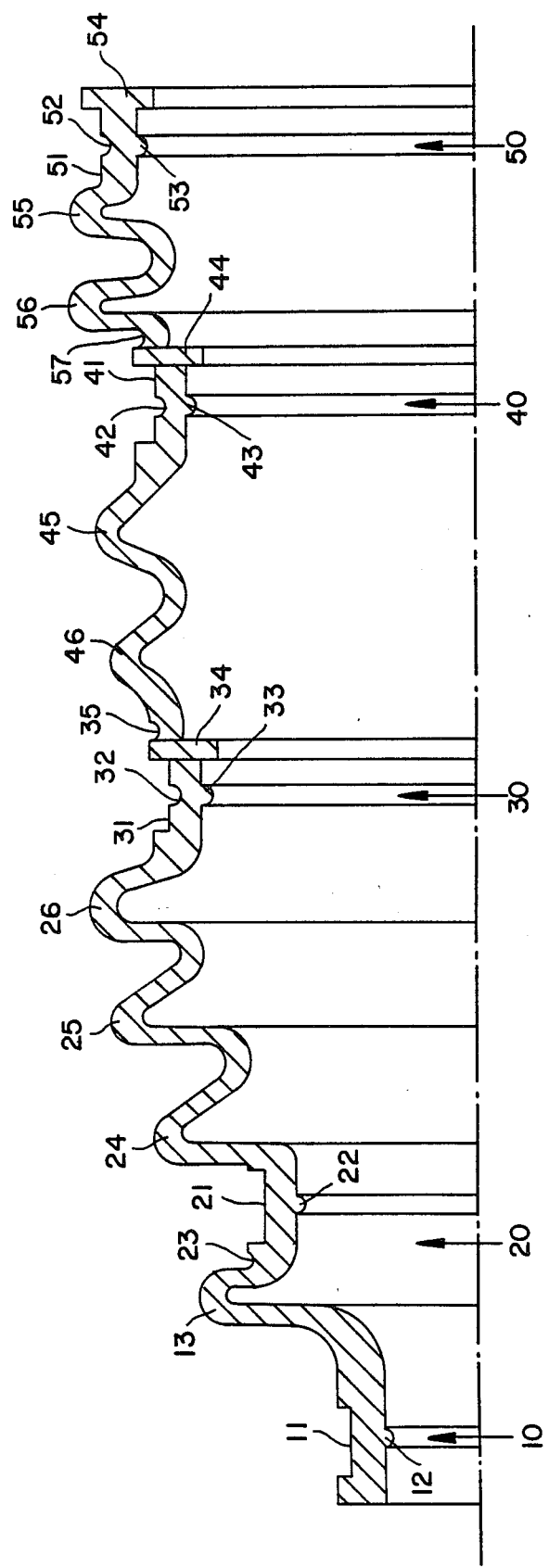
FIG. 1 is a sectional view of an uncut universal bellows in accordance with the invention in normal or slightly enlarged scale.

The uncut bellows, as shown in section in FIG. 1, is made of a suitable rubber material and represents as a whole a rotational part around the shaft 1. The basic shape is conical, i.e. the diameter of the folds increases from the narrow end towards the wide end. The narrow end, shown at the left in FIG. 1, consists of a cylindrical end section 10 on the outside of which a rectangular groove 11 is formed to receive a tightening strap and on the inside of which there is a seal lip 12. A first, comparatively steep fold 13 follows the cylindrical section. The former transitions into a second cylindrical section 20 with a somewhat larger diameter, on the outside of which there is also formed a rectangular groove 21 to receive a tightening strap and on the inside a seal lip 22. A separating groove 23 is formed between the rectangular groove 21 and the first fold 13 and defines the place where the bellows may be shortened. Further folds 24, 25 and 26 with increasing diameters adjoin the second cylindrical section 20. The two cylindrical sections 10 and 20 are suitable for connecting the bellows with a cylindrical machine part, e.g. a shaft.

The third cylindrical section 30 which adjoins the fold 26, also has on its exterior a rectangular groove 31 for receiving a tightening strap, to which a flange 34 is connected in the form of a T. A semicircular groove 32 is formed on the bottom of the rectangular groove nd a semicircular bead 33 of corresponding cross section is placed opposite from it on the inside. The bellows can be cut at a separating groove 35 adjacent to the third cylindrical section.

The part adjoining towards the right consists of relatively flat folds 46 and 45 and of another adjoining fourth cylindrical section 40, also suitable for connection to a disk-shaped machine part by means of a rectangular groove 41, semicircular groove 42 and semicircular bead 43 and flange 44.

The fifth cylindrical section 50, which represents the wide end section, also terminates in a flange 54 with a rectangular groove 51 being formed between it and the fold 55 having a semicircular groove 52 and opposite it a semicircular bead 53. A further separating groove 57 is provided for cutting off the end section.

The groove 51 can be considered as an end groove. The grooves 11, 21, 31, and 41 are strap grooves. The bead 53 and similar beads 12, 22, 33, and 43 are inwardly projecting means.

Figure 2:
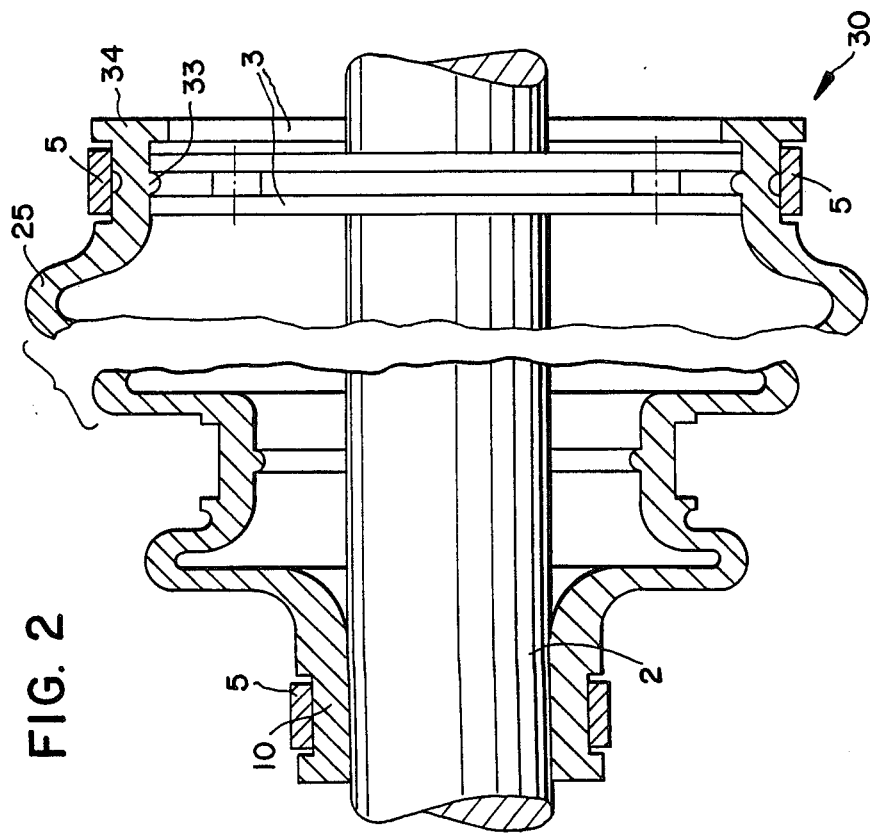
FIG. 2 illustrates the connection of such a bellows which, however, has been cut, with the two disks of a machine part and a universal joint.

FIG. 2 illustrates a shortened bellows which is connected on the left to a shaft 2 and on the right to two disks 3 which may be, for example, a part of a universal joint. The bellows according to FIG. 2 comprises the cylindrical sections 10, 20 and 30 in accordance with FIG. 1. A cut has been made at the separating groove 35.

The first cylindrical section 10 is drawn over the shaft 2 and is additionally secured by means of a tightening strap 5 which rests in the rectangular groove 11.

The third cylindrical section 30 is used for connecting the bellows with double disks 3 set at a distance. The semicircular bead 33 is located between the disks, the T-flange 34 abuts against the exterior of the right disk. The connection is secured by means of a tightening strap which rests in the rectangular groove 31.

Figure 3:
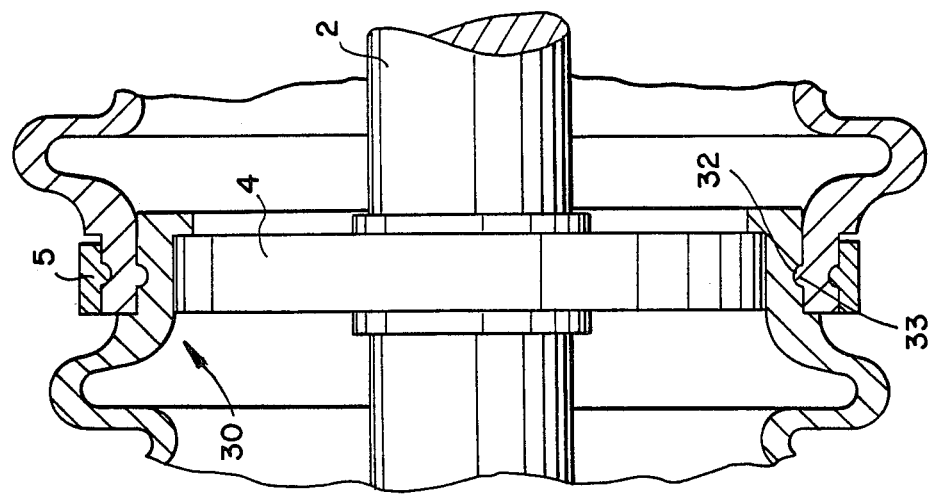
FIG. 3 illustrated the connection of two bellows for sealing a double universal joint.

According to FIG. 3 a machine part, e.g. a double universal joint, is covered by bellows on the left and right of a disk 4. The left bellows directly abuts against the circumference of the disk. The bellows located at the right and having the corresponding cylindrical section 30 is drawn over this bellows. The semicircular bead 33 of the covering bellows is received in the groove 32 of the lower bellows. Both bellows are secured by means of a tightening strap.

What is claimed is:

1. A bellows for protecting knuckle joints comprising:
   two end sections, each with a cylindrical surface means for connection to a machine part, one of said end sections being a larger diameter end section having a larger diameter than the other of said end sections;
   a first T-flange formed in said larger diameter end section;
   a first fold adjoining said larger diameter end section;
   an end groove for receiving a tightening strap, positioned in said larger diameter end section, and delimited by said first T-flange and said first fold;
   a plurality of connecting points including cylindrical surfaces of smaller diameter than said larger diameter end section, each connecting point having a T-flange, a strap groove for receiving a tightening strap, and a separating groove associated with each connecting point, each connecting point allowing connection to a different sized disk.

2. The bellow of claim 1 further comprising a semicircular groove disposed within at least one of said strap grooves and a semicircular bead inside of the bellows opposite the semicircular groove.

3. The bellows of claim 2 wherein each of said strap grooves includes a semicircular groove disposed therein and further comprising a plurality of semicircular beads on the inside of the bellows, each semicircular bead opposite a corresponding one of the semicircular grooves.

4. The bellows of claim 3 wherein the end groove is rectangular and each of the strap grooves is rectangular.

5. The bellows of claim 1 further comprising a semicircular groove disposed within said end groove and a semicircular bead on the inside of the bellows opposite said semicircular groove.

6. The bellows of claim 1 further comprising an intermediate section having a cylindrical surface with a diameter intermediate to diameters of said two end sections, said intermediate section operable for connecting the bellows to a shaft.

7. The bellows of claim 1 further comprising an inwardly projecting means inside of the bellows and adjacent to each T-flange for accommodating a disk between the inwardly projecting means and the adjacent T-flange.

* * * * *

UNITED STATES PATENT AND TRADEMARK OFFICE
CERTIFICATE OF CORRECTION

PATENT NO. : 4,878,389

DATED : November 7, 1989

INVENTOR(S) : Ferdinand BOGE

It is certified that error appears in the above-identified patent and that said Letters Patent is hereby corrected as shown below:

On Title Page: Abstract: Line 7, change "oder" to -- order --.

Column 4, line 8, Claim 2, change "bellow" to -- bellows --.

Signed and Sealed this

Thirteenth Day of November, 1990

Attest:

HARRY F. MANBECK, JR.

*Attesting Officer*     *Commissioner of Patents and Trademarks*